United States Patent
Takahashi et al.

(10) Patent No.: US 8,233,737 B2
(45) Date of Patent: Jul. 31, 2012

(54) NOISE CORRECTION CIRCUIT, IMAGING APPARATUS, AND NOISE CORRECTION METHOD ADDING RANDOM NUMBER AFTER NOISE REMOVAL

(75) Inventors: Kazushige Takahashi, Kanagawa (JP); Hiromasa Ikeyama, Tokyo (JP); Manabu Hara, Kanagawa (JP); Yukihiro Kinoshita, Kanagawa (JP)

(73) Assignee: Sony Corporation (JP)

( * ) Notice: Subject to any disclaimer, the term of this patent is extended or adjusted under 35 U.S.C. 154(b) by 831 days.

(21) Appl. No.: 12/287,926

(22) Filed: Oct. 15, 2008

(65) Prior Publication Data
US 2009/0103829 A1   Apr. 23, 2009

(30) Foreign Application Priority Data
Oct. 22, 2007   (JP) ................ P2007-274496

(51) Int. Cl.
*G06K 9/40*   (2006.01)
*H04N 5/14*   (2006.01)

(52) U.S. Cl. ....................... 382/261; 348/576
(58) Field of Classification Search .......... 382/261
See application file for complete search history.

(56) References Cited

U.S. PATENT DOCUMENTS

| | | | |
|---|---|---|---|
| 5,245,432 A * | 9/1993 | Jaffray et al. | 348/578 |
| 5,513,277 A * | 4/1996 | Huttenlocher | 382/171 |
| 7,265,687 B2 | 9/2007 | Nishide et al. | |
| 2002/0118392 A1 * | 8/2002 | Miyake | 358/3.03 |
| 2005/0140795 A1 * | 6/2005 | Hisamatsu et al. | 348/222.1 |
| 2006/0092287 A1 | 5/2006 | Hara et al. | |
| 2007/0024636 A1 * | 2/2007 | Lo | 345/596 |
| 2007/0038418 A1 * | 2/2007 | Ahn et al. | 703/2 |

FOREIGN PATENT DOCUMENTS

| | | |
|---|---|---|
| EP | 0357084 A1 | 3/1990 |
| EP | 0673149 A1 | 9/1995 |
| EP | 1615425 A1 | 1/2006 |
| JP | 2005-130331 A | 5/2005 |
| JP | 2006-135423 A | 5/2006 |
| JP | 2006-222479 A | 8/2006 |

OTHER PUBLICATIONS

European Search Report, EP 08253255, dated Oct. 23, 2009.

* cited by examiner

*Primary Examiner* — David Zarka
(74) *Attorney, Agent, or Firm* — Lerner, David, Littenberg, Krumholz & Mentlik, LLP

(57) ABSTRACT

A noise correction circuit that detects and corrects noise included in an image signal output from an image sensor is provided. The noise correction circuit includes a noise determining unit, a noise removing unit, and a random number adding unit. The noise determining unit is configured to calculate an average value of a signal level in a predetermined range of the image signal output from the image sensor and use the calculated average value to calculate a noise component in a predetermined direction. The noise removing unit is configured to remove noise from the image signal output from the image sensor in response to the noise component determined by the noise determining unit. The random number adding unit is configured to add a random number at a level not determined by quantization of the image signal to the image signal after removal of the noise by the noise removing unit.

7 Claims, 13 Drawing Sheets

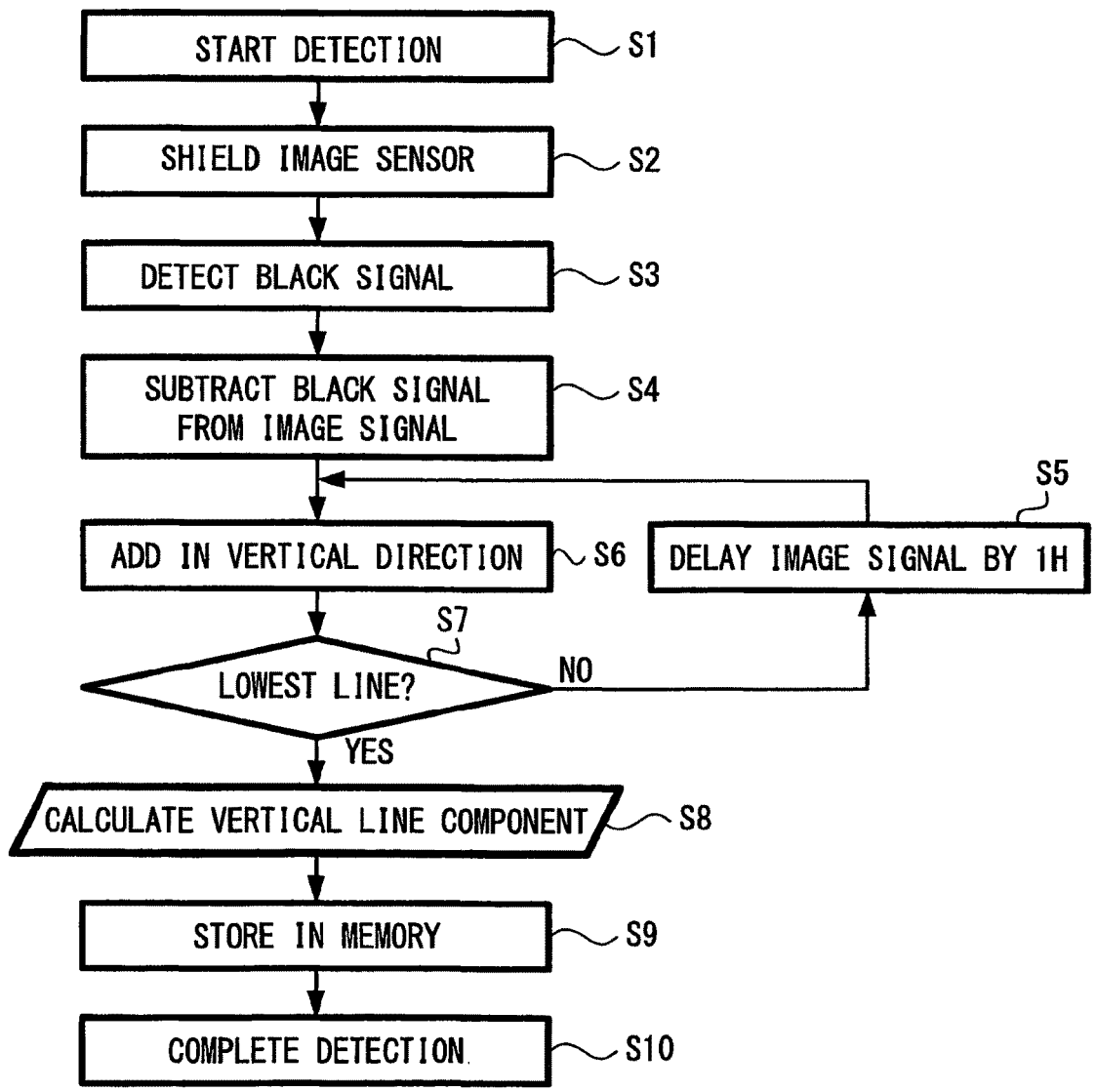

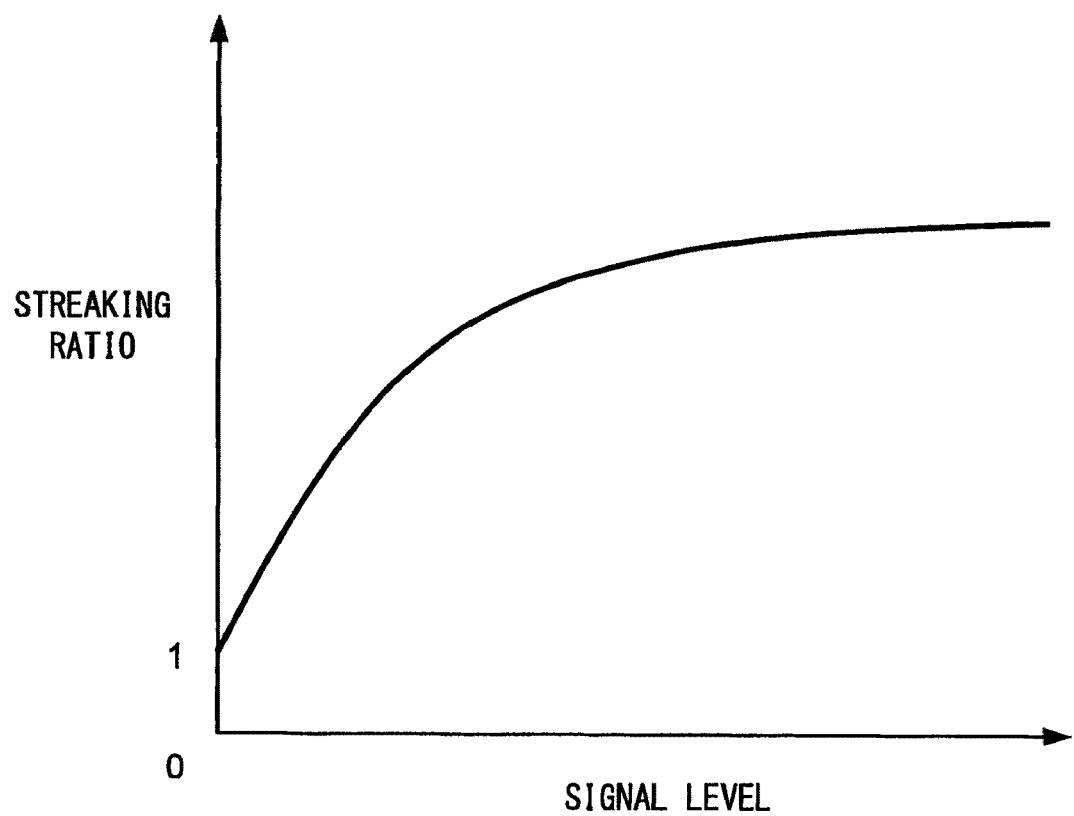

NOISE CORRECTION CIRCUIT, IMAGING APPARATUS, AND NOISE CORRECTION METHOD ADDING RANDOM NUMBER AFTER NOISE REMOVAL

CROSS REFERENCE TO RELATED APPLICATION

The present application claims priority from Japanese Patent Application JP No. 2007-274496 filed in the Japanese Patent Office on Oct. 22, 2007, the entire content of which is incorporated herein by reference.

BACKGROUND OF THE INVENTION

1. Field of the Invention

The present invention relates to a fixed pattern noise correction circuit that removes noise included in an image signal output from an image sensor, to an imaging apparatus including such fixed pattern noise correction circuit, and to a fixed pattern noise correction method applied to an imaging apparatus.

2. Description of the Related Art

In the past, a variety of solid-state imaging apparatuses that use a sensor such as a CMOS (Complementary Metal Oxide Semiconductor) image sensor or a CCD (Charge Coupled Device) image sensor have been developed and commercialized. Such solid-state imaging apparatuses may have fixed pattern noise that is present at the same pixel positions irrespective of time. One example of a known type of fixed pattern noise is in the form of vertical lines (i.e., perpendicular lines). That is, when a CMOS image sensor is constructed such that one circuit is used for each column of pixels in the vertical direction, noise in the form of vertical lines is produced due to nonuniformity in the characteristics of the circuits used for the respective columns of pixels.

A number of methods for correcting noise in the form of vertical lines have been proposed. However, when such vertical lines are corrected during digital signal processing, the detected vertical line components are subtracted from the original image signal, and therefore it is difficult to correct noise in the form of vertical lines at a level not determined by quantization of the image signal.

Also, when an image of a high-luminance subject is captured using a solid-state imaging apparatus, there are cases where noise referred to as "streaking" is produced in the horizontal direction in the captured image. As one example, it is possible to correct streaking by correcting differences in DC level compared to when image is captured with pixel portions shielded from light. Japanese Unexamined Patent Application Publication No. 2005-130331 discloses one example of such a method for correcting streaking.

SUMMARY OF THE INVENTION

When noise in the form of vertical lines is present, as described earlier, it is possible to carry out correction that subtracts the detected vertical line components from the original image signal. With this method, however, it is difficult to correct vertical lines at a level not determined by quantization of the image signal. This means that if digital amplification is carried out while sufficient light is not input into the image sensor and the output signal level after analogue to digital conversion is low, such vertical lines at a level not determined by quantization and therefore not corrected will be amplified together with the image signal components, which results in a distinct quantization error. Such errors appear as vertical lines of noise, causing significant deterioration in image quality.

During streaking correction also, if errors at a level not determined by quantization are amplified, this will produce horizontal lines of noise, which also results in significant deterioration in image quality.

It is desirable to efficiently correct noise in the forms of vertical and horizontal lines produced in an image sensor so as to become inconspicuous.

According to an embodiment of the present invention, there is provided a noise correction method. With the noise correction method, noise included in an image signal output from an image sensor is detected and corrected. The noise correction method includes the steps of:

calculating an average value of a signal level in a predetermined range of the image signal output from the image sensor;

calculating a noise component in a predetermined direction of the image signal output from the image sensor using the calculated average value;

removing noise from the image signal output from the image sensor in response to the calculated noise component; and adding a random number at a level not determined by quantization of the image signal to the image signal after removal of the noise.

By adding a random number at a level not determined by quantization to the image signal, there will be cases where the least significant bit is raised to one or remains unchanged depending on the value of the random number. Accordingly, the value of the least significant bit is prevented from being uniform in the same column, and when the output image signal is displayed, there is no noise in the form of continuous vertical lines, which prevents the noise from being conspicuous.

According to an embodiment of the present invention, a random number at a level not determined by quantization is added, thereby preventing the value of the least significant bit of the output image signal from being uniform in the same column, so that vertical line noise is reduced and noise can suitably be removed.

BRIEF DESCRIPTION OF THE DRAWINGS

FIG. 5 is a diagram showing examples of random numbers generated with the configuration shown in FIG. 4.

FIG. 6 is a flowchart showing an example of detection processing for a vertical line noise component according to the first embodiment of the present invention.

8A shows correction processing according to an embodiment of the present invention and FIG. 8B shows correction processing according to the related art.

FIG. 14 is a characteristic curve showing an example of a signal level and a streaking ratio according to the second embodiment of the present invention.

DESCRIPTION OF THE PREFERRED EMBODIMENTS

Figure 1:
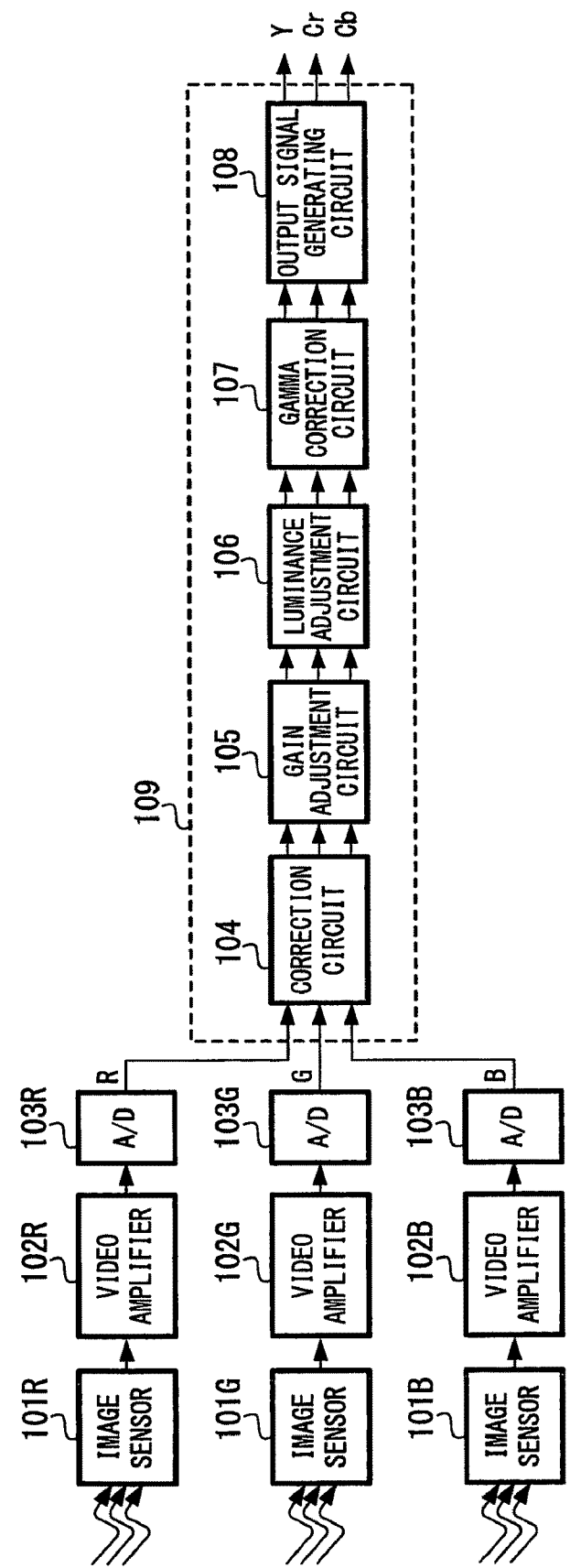
FIG. 1 is a block diagram showing a circuit configuration of an imaging apparatus according to a first embodiment of the present invention.

A first embodiment of the present invention will be described with reference to FIGS. 1 to 9. FIG. 1 is a diagram showing the overall configuration of an imaging apparatus 100 according to an embodiment of the present invention. The imaging apparatus 100 is a three-sensor color imaging apparatus where a separate image sensor is provided for each color. That is, the imaging apparatus 100 includes image sensors 101R, 101G, and 101B. The image sensors 101R, 101G, and 101B are image sensors that capture images of red, green, and blue, respectively. In the present embodiment, CMOS image sensors are used as the image sensors. A specific example configuration of a CMOS image sensor will be described later. The image signals captured and output by the image sensors 101R, 101G, and 101B are amplified to an appropriate level by video amplifiers 102R, 102G, and 102B and are then converted to digital data R, G, and B for the respective colors by analog/digital converters 103R, 103G, and 103B. The converted data is subjected to image signal processing in a video processing unit 109.

The video processing unit 109 includes a correction circuit 104 that corrects the image signals, a gain adjustment circuit 105 that carries out a gain adjustment such as adjustment of white balance, a luminance adjustment circuit 106 that adjusts luminance, a gamma correction circuit 107 that carries out gamma correction, and an output signal generating circuit 108 that converts the signals to image signals of the appropriate output format. Examples of the correction processing carried out in the correction circuit 104 include defect pixel correction processing for the imager, vertical line correction, streaking correction, and the like. Vertical line correction processing will be later described in detail. Here, as one example, luminance data Y and color difference data Cr, Cb are output from the output signal generating circuit 108.

The operation of the imaging apparatus 100 will be described in brief. Light from a subject obtained by an optical system, not shown, is incident on the respective imaging surfaces of the image sensors 101R, 101G, and 101B that are provided for the respective primary colors to form images of the respective primary colors red, green, and blue on the imaging surfaces. The primary color images are read as pixel signals by light receiving elements forming pixels disposed in matrices on the imaging surfaces of the image sensors, and by reading the pixel signals obtained at each sensor in order, image signals for one frame are output. The image signals output from the image sensors 101R, 101G, and 101B are converted to digital data in the analog/digital converters 103R, 103G, and 103B and then the image processing described above is carried out in the respective circuits inside the video processing unit 109. Note that as described below, the analog/digital converters 103R, 103G, and 103B are provided for each vertical line in the present embodiment.

Figure 2:
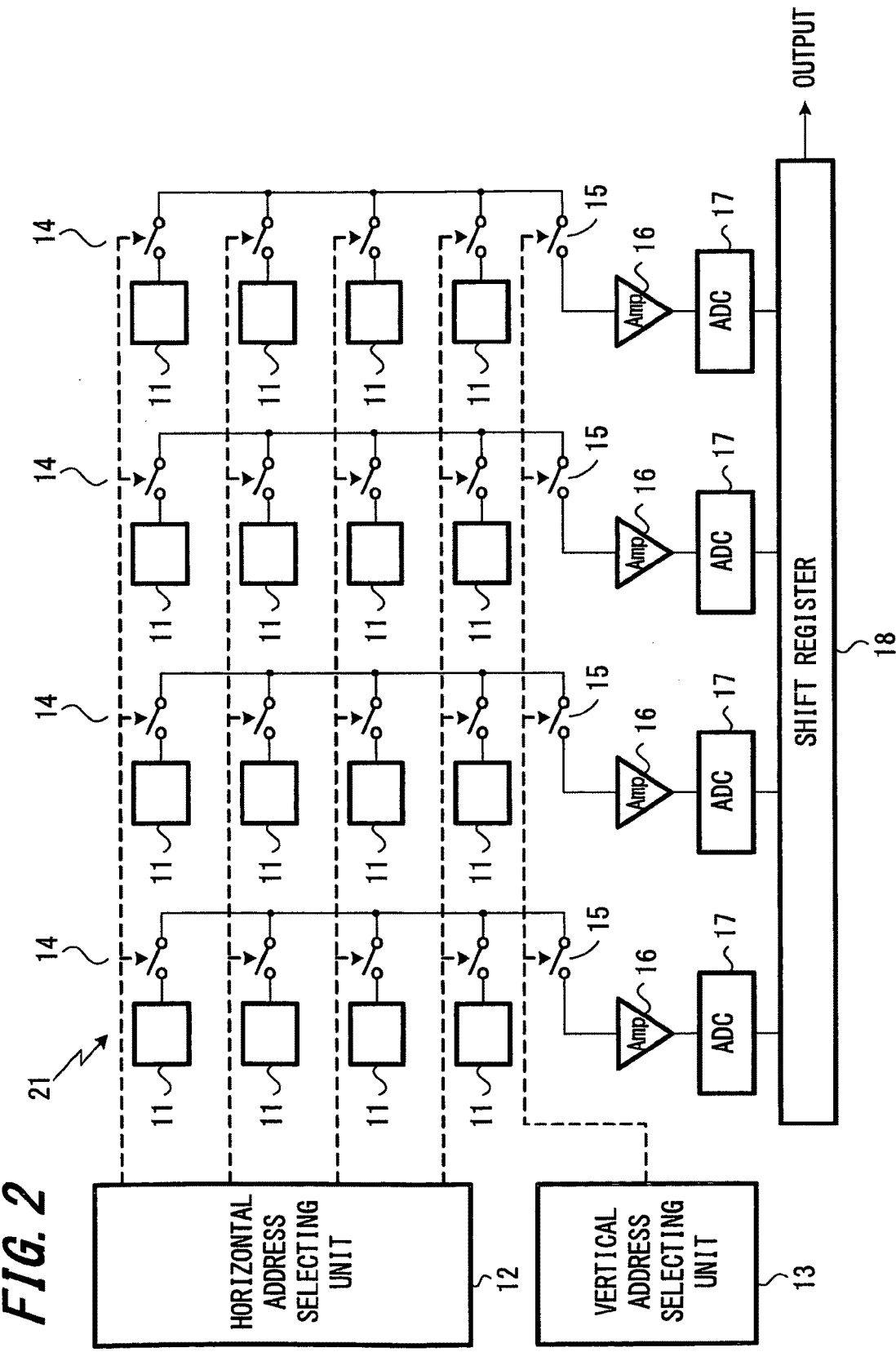
FIG. 2 is a block diagram showing a circuit configuration of an image sensor.

Next, the configuration of the image sensors 101R, 101G, and 101B that are constructed of CMOS image sensors will be described with reference to FIG. 2. As shown in FIG. 2, the light receiving elements forming pixels 11 are disposed in a matrix on the imaging surface. On/off control of switches 14 connected to the pixels 11 is carried out by a horizontal address selecting unit 12 and on/off control of switches 15 is carried out by a vertical address selecting unit 13 so that signals are read from the pixels 11 in order for one horizontal line at a time. The signals selected on each vertical line using the switches 14, 15 are amplified in amplifiers 16 and then converted to digital data by an analog/digital converter 17 provided for each vertical line. In the present embodiment, one pixel data is eight-bit digital data, for example. The converted digital data on each vertical line is simultaneously transferred to a shift register 18 and is output in order one horizontal line at a time from the shift register 18.

The configuration shown in FIG. 2 that includes an amplifier 16 and an analog/digital converter 17 for each vertical line is characteristic to a CMOS image sensor. Since the configuration includes an amplifier 16 and an analog/digital converter 17 for each vertical line as shown in FIG. 2, due to nonuniformity in the characteristics of the amplifiers 16 and the analog/digital converters 17, noise may occur for vertical columns of pixels, that is, vertical line noise is produced as noise unique to each image sensor. In the present embodiment, processing that corrects such vertical line noise is carried out. The vertical-line noise correction processing is carried out as one of the correction processes in the correction circuit 104 shown in FIG. 1.

Figure 3:
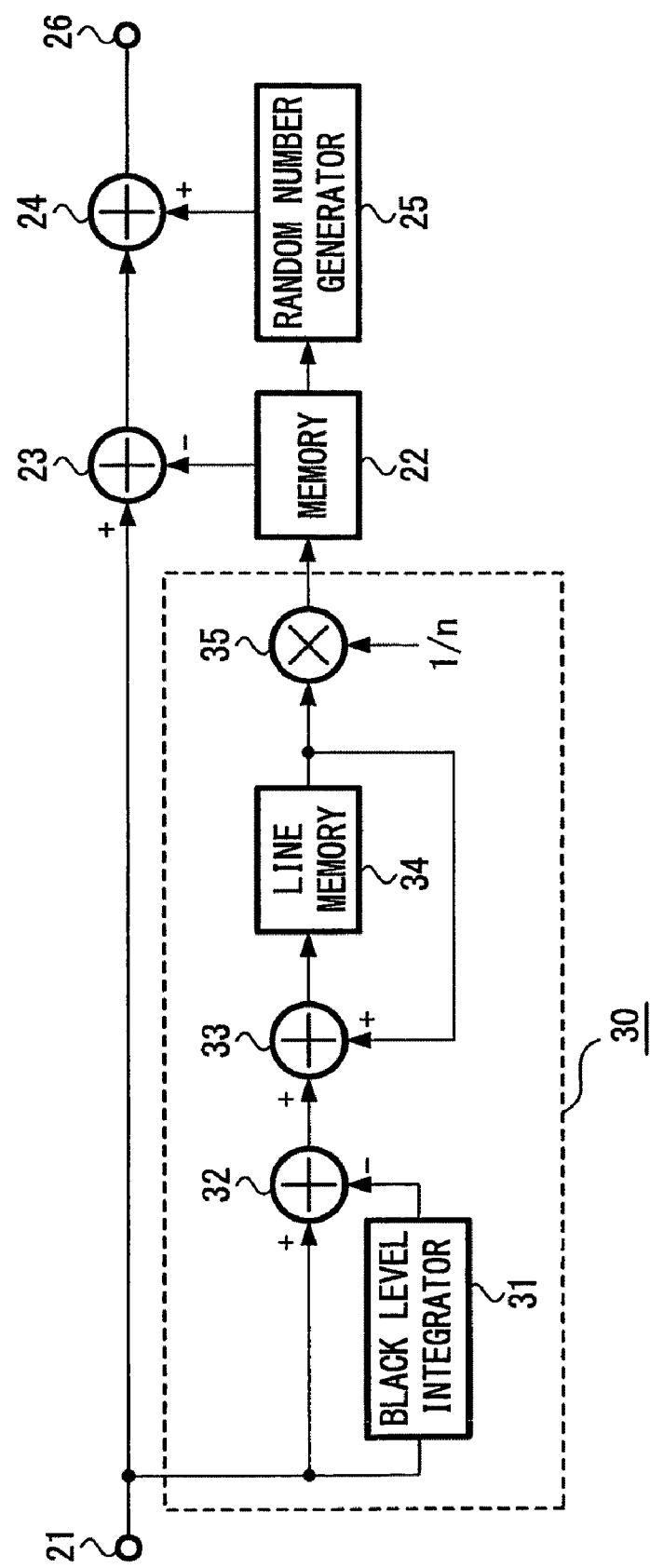
FIG. 3 is a block diagram showing examples of a noise detecting circuit and a correction circuit according to the first embodiment of the present invention.

FIG. 3 shows an example configuration of a noise detecting unit 30, which is included in the correction circuit 104 shown in FIG. 1 and detects vertical line noise, and a correction unit that removes noise detected by the noise detecting unit 30. The processing of detecting the vertical line noise by the noise detecting unit 30 is carried out during manufacturing of an imaging apparatus, for example, and the detected noise amount is stored in a memory 22. When carrying out imaging using the imaging apparatus, noise correction that subtracts the noise amount stored in the memory 22 from the image signal obtained by imaging is carried out.

The configuration of the noise detecting unit 30 shown in FIG. 3 will now be described. The image signal obtained at an input terminal 21 in the correction circuit 104 (see FIG. 1) is supplied to the noise detecting unit 30. In the noise detecting unit 30, image signals for a black level are integrated by a black level integrator 31. Accordingly, processing that integrates the black level in any region in a single frame and obtains an average black level is carried out. The value produced by integration carried out by the black level integrator 31 is supplied to a subtractor 32 that subtracts the value produced by the black level integrator 31 from the image signal obtained from the input terminal 21.

The signal produced by the subtractor 32 subtracting the integrated value of the black level is supplied to an adder 33 and the output of the adder 33 is added to a signal that has been delayed in a line memory 34 by the period of one horizontal line. The signal that has been added by the adder 33 and delayed at the line memory 34 is supplied to a multiplier 35 that multiplies the signal by 1/n (where n is the number of pixels on the image sensor) to produce the amount of noise per pixel. In this way, by adding in order a value produced by subtracting the integrated value of the black level in any range to the signal delayed in a line memory 34 by the period of one horizontal line, a noise amount for each vertical line is detected. That is, processing is carried out to find the noise amount for each vertical line in the signal level of the range integrated by the black level integrator 31 in the image sensor.

The output of the multiplier 35 is stored in the memory 22 as the noise amount of each vertical line detected by the noise detecting unit 30. The storage operation into the memory 22 is carried out during initial settings, such as during the manufacturing of the imaging apparatus.

When imaging is carried out using the imaging apparatus, as shown in FIG. 3, the image signal that was obtained by capturing an image and has been input into the input terminal 21 is supplied to a subtractor 23. In the subtractor 23, the noise amount stored in the memory 22 is subtracted from the image signal. Since the noise amounts are stored as noise amounts of each vertical line as described earlier, the noise amount corresponding to the position of the vertical line of the image signal supplied from the input terminal 21 is read out. With such configuration, correction of "vertical line noise" is carried out by the subtractor 23. The processing thusfar is fundamentally the same as the correction processing for vertical lines that is known from the past.

In the present embodiment, as shown in FIG. 3, the output of the subtractor 23 is supplied to an adder 24 that adds a random number supplied from a random number generator 25, and the added signal is supplied to an output terminal 26 for outputting a corrected signal.

In more detail, in the addition processing of the adder 24, the corrected image signal that has been output from the subtractor 23 is a signal produced by subtracting a noise signal obtained as an average and, due to the averaging, is therefore a signal where a number of bits that is below the number of bits in the original image signal (that is, not determined by quantization) have been appended after the least significant bit. In the random number generator 25, a random number with a number of bits that is no greater than the number of such appended bits is generated, and the generated random number is added to the least significant bits by the adder 24. Subsequently, processing of dropping the least significant bits of the image signal after the addition of the random number by the adder 24 is carried out, and an image signal with a predetermined number of bits (that is, the number of bits at the level determined by quantization) is supplied from the output terminal 26 to the subsequent circuits.

Figure 4:
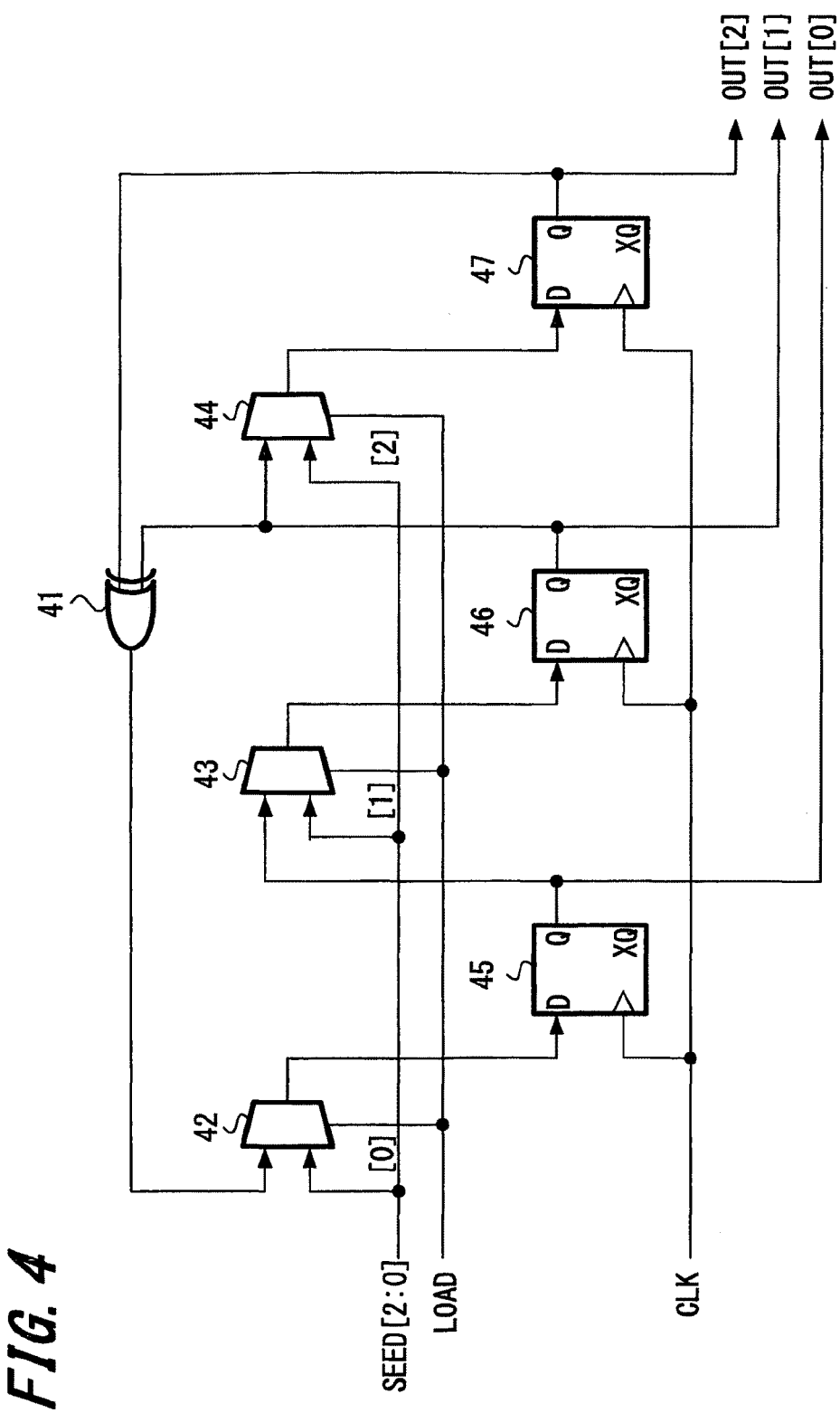
FIG. 4 is a diagram showing a configuration of a random number generating circuit according to the first embodiment of the present invention.

FIG. 4 is a diagram showing an example configuration of the random number generator 25. The configuration shown in FIG. 4 is an M-series cyclic code generator that obtains a three-bit random number. The input data is supplied to one input terminal of selectors 42, 43, and 44 and the outputs from the selectors 42, 43, and 44 are supplied to the respective D input terminals of flip-flops 45, 46, and 47. The flip-flops 45, 46, and 47 are supplied with the same clock. The output of the flip-flop 45 is supplied to the other input terminal of the selector 43, the output of the flip-flop 46 is supplied to the other input terminal of the selector 44, and the output of the flip-flop 46 and the output of the flip-flop 47 are supplied via an EXOR (EXclusive OR) gate 41 to the other input terminal of the selector 42. In this configuration, the outputs of the flip-flops 45, 46, and 47 are set as the three-bit output OUT[0], OUT[1], OUT[2].

Using the configuration shown in FIG. 4, the order of the three-bit output OUT[0], OUT[1], OUT[2] changes in order as shown in FIG. 5, for example, to obtain a virtual random number.

That is, when the LOAD pulse supplied to each selector is one, the value SEED is selected by the selectors 42, 43, and 44 and the selected values are input into the flip-flops 45, 46, and 47. When the LOAD pulse is zero, the selectors 42, 43, and 44 select the input that is not SEED. An operation that generates a three-bit virtual random number that changes in each clock cycle is carried out such that when the binary value "111" is input into SEED and loaded, due to feedback from the EXOR 41, the output changes to "110" in the next clock, "100" in the clock after that, . . . . Note that the LOAD pulse is controlled by a control unit (not shown) of the imaging apparatus, for example and any bits of the image signal are input into SEED.

Next, the processing when vertical line noise is detected and corrected using the configuration of the present embodiment will be described with reference to FIGS. 6 and 7. First, example processing that detects the vertical line noise component will be described with reference to the flowchart in FIG. 6. When processing of detecting the noise component is started (step S1), first the image sensors of the respective colors are shielded and imaging is carried out in the shielded state (step S2). The image signals captured in this state are imaging signals for the black level and therefore black level signals are detected (step S3). The black level signals are subtracted from the image signals obtained by imaging (step S4), the signals from which the black level has been subtracted are added in the vertical direction (step S6), and it is determined whether the signal is for the lowest line (step S7). When the signal is not for the lowest line, the image signal is delayed by the period of one horizontal line (step S5) and the adding in step S6 is repeated. When it is determined in step S7 that the signal is for the lowest line, the noise amount for the vertical line component is calculated in response to the added value at that time (step S8). The noise amount calculated for each vertical line is stored in the memory 22 (step S9) and the detection processing is completed (step S10).

Next, noise removal during imaging using the data stored in the memory 22 in this way will be described with reference to the flowchart in FIG. 7. When an image signal is input from the input terminal 21 (step S11), the signal of the vertical line component is subtracted from the input signal by the subtractor 23 (step S12). For example, the image signals obtained in step S11 may be eight bits per color for each pixel. Here, the subtraction in step S12 appends two bits to the least significant bit, increasing the number of bits to ten.

In this case, a two-bit random number is added by the adder 24 to the lowest two bits of the ten-bit data output from the subtractor 23 (step S13). Here, the result of such adding is clipped to ten bits. The least significant two bits are also rounded down (step S14) to obtain the corrected value (step S15).

Figure 7:
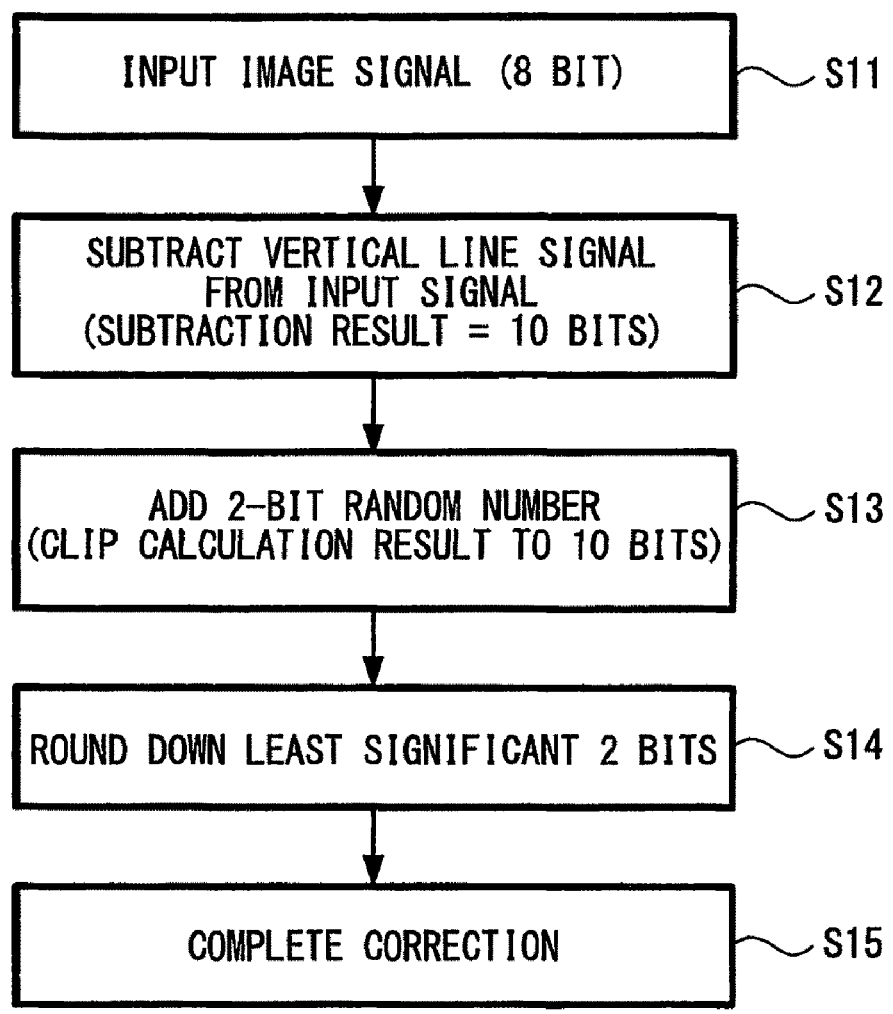
FIG. 7 is a flowchart showing an example of noise correction processing for vertical lines according to the first embodiment of the present invention.
Figure 8A:
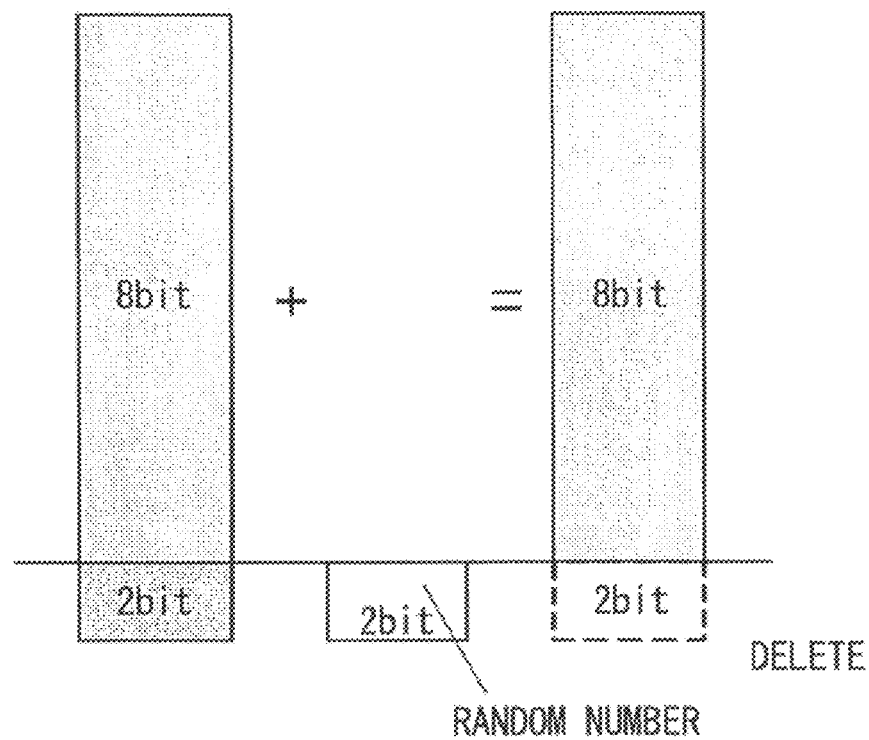
FIGS. 8A and 8B are diagrams for comparing correction processing according to the first embodiment of the present invention with correction processing in the past, where FIG.
Figure 8B:
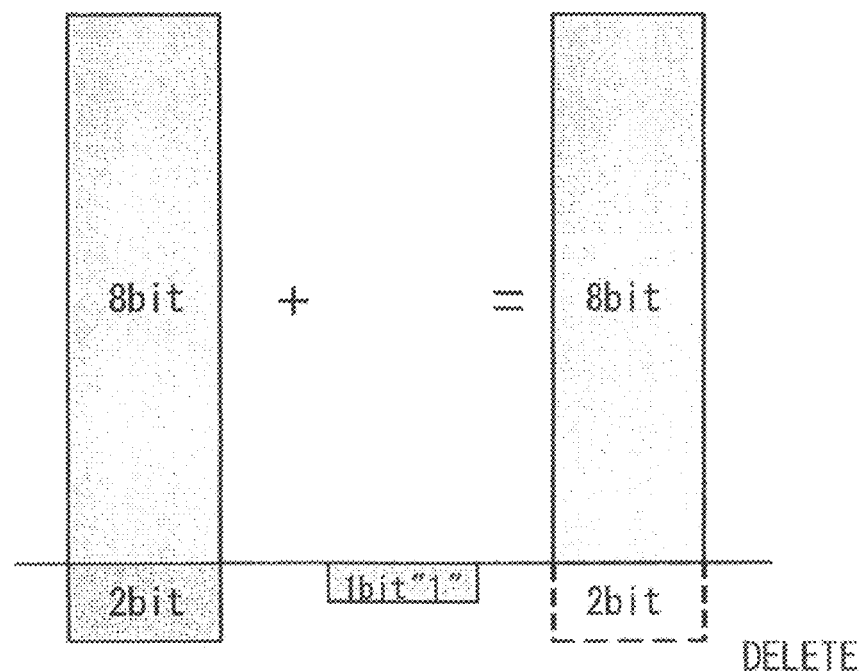

FIGS. 8A and 8B are used to explain the processing in the flowchart in FIG. 7. FIG. 8A shows one example of the processing according to the present embodiment and FIG. 8B shows one comparative example of processing according to the related art. As shown in FIG. 8A, in the example of the present embodiment, one pixel is represented by an eight-bit signal and two bits are appended to the least significant bit of such eight-bit signal during the subtraction of the vertical line component. These lowest two bits are a signal at a level not determined by quantization in the analog/digital converters. By adding a two-bit random number to such ten-bit signal, a ten-bit addition result is obtained. The least significant two bits of the ten-bit addition result are deleted and the correction result including the most significant eight bits is output. By carrying out such processing, there will be both cases where the value of the least significant bit in the output eight-bit value changes in accordance with the random number and cases where the value of the least significant bit may not change.

On the other hand, as shown in FIG. 8B, according to the related-art correction processing, when one pixel is represented by an eight-bit signal and the vertical signal component is subtracted to produce a ten-bit signal, rounding processing is carried out in accordance with the more significant of the least significant two bits.

Figure 9A:
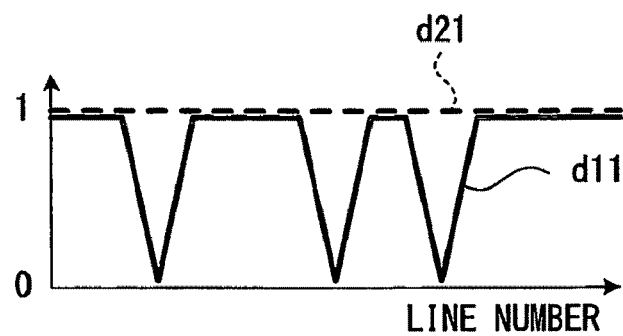
FIGS. 9A to 9D are diagrams showing an example of the effect of adding a random number according to the first embodiment of the present invention.
Figure 9B:
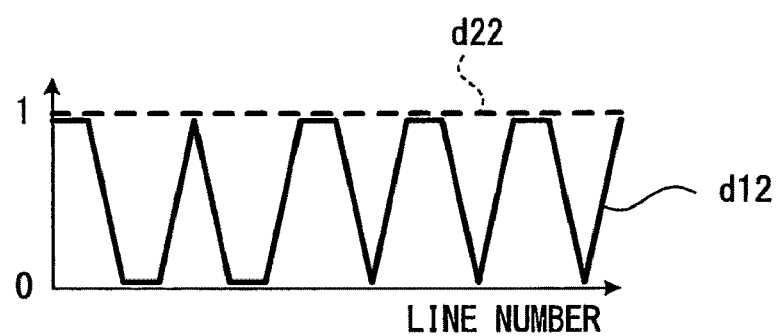
Figure 9C:
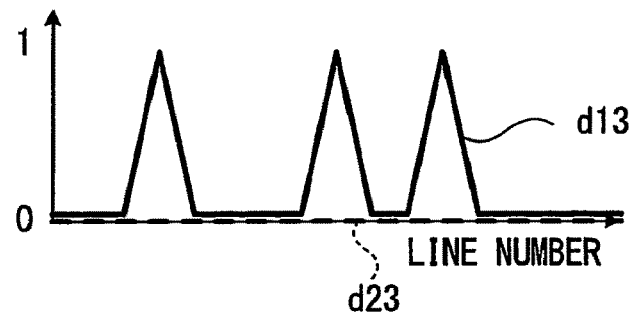
Figure 9D:
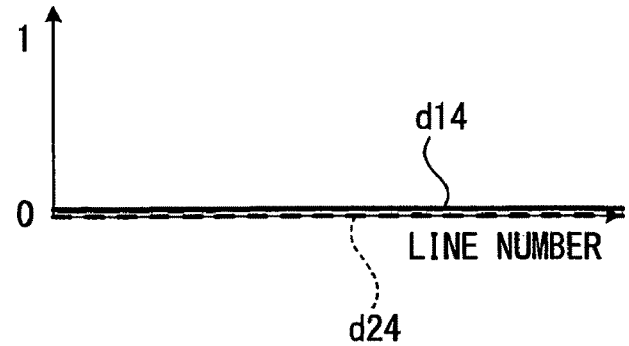

FIGS. 9A to 9D show the result of adding a random number according to the present embodiment. FIG. 9A shows an example where the least significant two bits are "11", FIG. 9B shows an example where the least significant two bits are "10", FIG. 9C shows an example where the least significant two bits are "01", and FIG. 9D shows an example where the least significant two bits are "00". The vertical axis in each graph is the least significant bit of an eight-bit output after adding and the horizontal axis is the number of a horizontal line. The characteristics shown by the solid lines in the graphs show the change characteristics d11, d12, d13, and d14 of the values for the present embodiment (i.e., the values produced by adding a random number). The characteristics shown by the broken lines show the change characteristics d21, d22, d23, and d24 of the values for the related art example (i.e., values produced by the rounding processing shown in FIG. 8B).

As understood from FIGS. 9A to 9D, when the least significant bits are "11", "10", "01", the value of the least significant bit in the characteristics d11, d12, d13 produced by adding a random number changes in accordance with the random number. Only when the least significant two bits are "00", the least significant bit remain at "0" without changing. Also, since a carry to the least significant bit of an eight-bit output is produced with a probability in accordance with the value of the least significant two bits, when a single vertical line is viewed as a whole, the information of the least significant two bits is preserved.

On the other hand, with the existing rounding processing, in each of the illustrated cases, all of the values on the same vertical line are the same. That is, in the characteristic d21 where the least significant two bits are "11", the value of the least significant bit of the vertical line remains at "1" and in the characteristic d22 where the least significant two bits are "10", the value of the least significant bit of the vertical line also remains at "1". In addition, in the characteristic d23 where the least significant two bits are "01", the value of the least significant bit of the vertical line remains at "0", and in the characteristic d24 where the least significant two bits are "00", the value of the least significant bit of the vertical line also remains at "0".

By adding a random number according to the embodiment, a state where the least significant bit of the corrected image signal has the same value on a vertical line is prevented. In addition, as described earlier, if one vertical line is viewed as a whole, the information of the least significant two bits in the ten bits after subtraction of the vertical line component is preserved and the vertical line will change in one of four patterns. Accordingly, even if amplification is carried out after correction, there may be no cases where the vertical line will become conspicuous due to the influence of the noise component remaining after correction. Specifically, in a display image formed with image signals to which random numbers have been added, vertical lines may no longer be continuous even in an image with a high gain and the vertical lines will appear faint, so that as a result, the vertical lines may no longer be conspicuous in the display image. On the other hand, since the same correction data is used along a vertical column of pixels during the vertical line correction according to the related-art rounding processing, the error produced by rounding will remain constant along a vertical column of pixels, causing the error component to be visible as a vertical line.

As described above, by carrying out the processing according to the present embodiment, the quantization error of the vertical line correction is reduced using the integration characteristics of the human eye, which makes it possible to greatly improve the image quality when digital amplification is carried out in low light conditions.

Note that although an example where the vertical line component has two valid bits below the least significant bit of the image signal has been described above, the number of valid bits may increase when a larger number of lines are integrated, and by increasing the corresponding number of bits in the random number, a greater effect can be obtained.

The configuration shown in FIG. 4 for adding the random number only shows the processing on the image signal of a single color. Practically, a random number is added using the same configuration to the image signals R, G, B of the respective colors. In such case, separate random number generators may be provided for the image signals R, G, B of the three colors so that different random numbers are added respectively. Accordingly, the state of the least significant bit for each color may vary even on the same vertical line, thereby dispersing the quantization error more effectively to improve image quality.

Next, a second embodiment of the present invention will be described with reference to FIGS. 10 to 14. In this second embodiment, the processing described in the first embodiment that adds a random number during the noise correction of vertical lines to prevent errors at a level not determined by quantization of the vertical lines from becoming conspicuous is adapted to the correction of streaking, or in other words, noise components in the horizontal direction.

An imaging apparatus according to the second embodiment has an overall configuration similar to the above-described imaging apparatus 100 shown in FIG. 1. As the image sensors 101R, 101G, and 101B provided in the imaging apparatus 100, it is possible to use various types of sensors such as CMOS image sensors and CCD image sensors. One type of correction processing carried out by the correction circuit 104 in the imaging apparatus 100 is correction of streaking, i.e., correction of errors in the horizontal direction. During streaking correction, it is preferable to detect and correct streaking amounts in image signals before adjustment of gain.

Streaking correction is carried out by detecting streaking amounts from shielded parts of the image sensor, generating correction amounts, and subtracting the generated correction amounts from the original signals.

Figure 10:
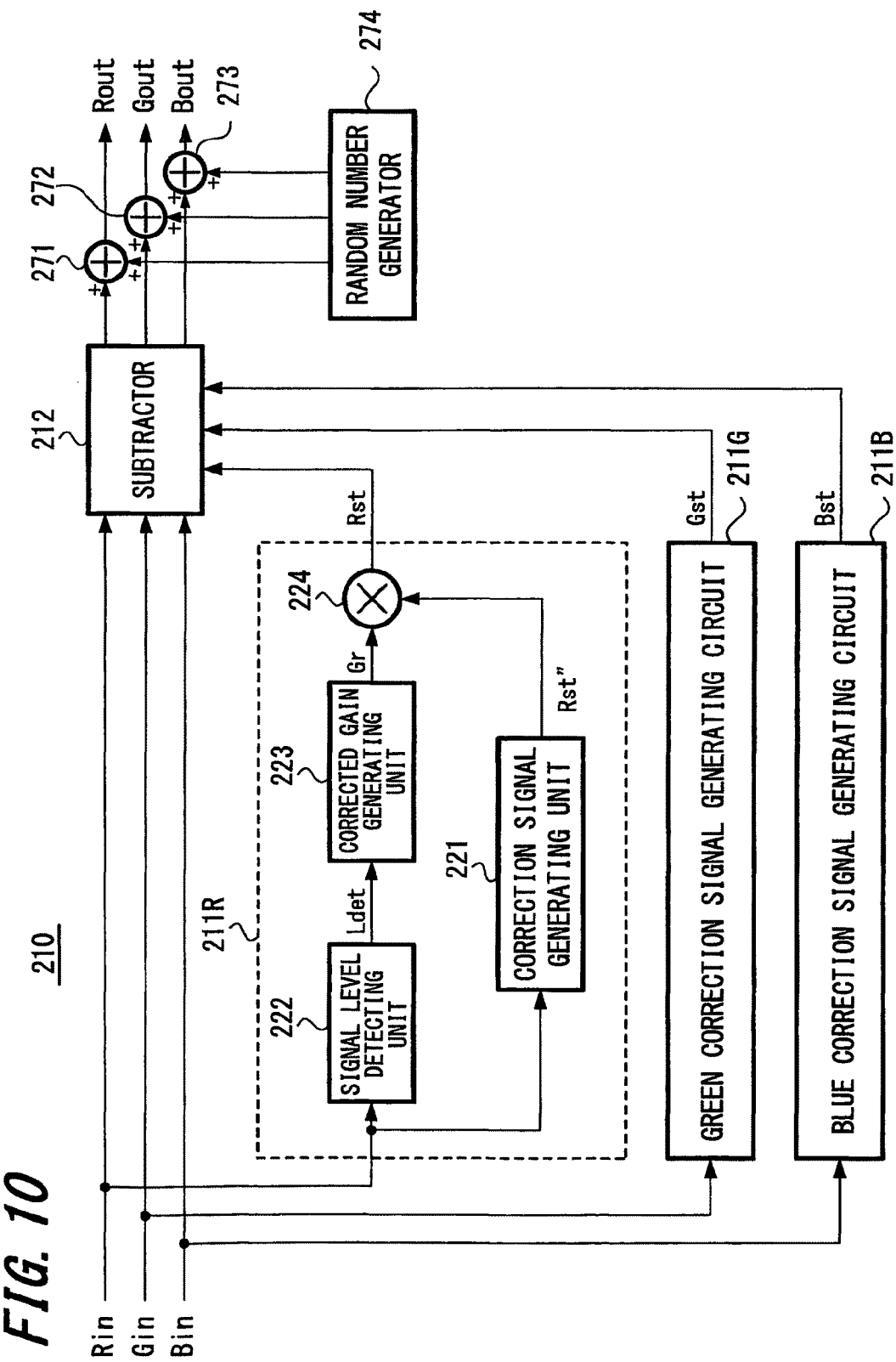
FIG. 10 is a block diagram showing a circuit configuration of an imaging apparatus according to a second embodiment of the present invention.

FIG. 10 is a diagram showing an example configuration that carries out streaking correction according to the present embodiment. As shown in FIG. 10, a red correction signal generating circuit 211R, a green correction signal generating circuit 211G, and a blue correction signal generating circuit 211B are circuits that detect the respective streaking amounts from the image signals of the respective colors.

The red correction signal generating circuit 211R includes a correction signal generating unit 221, a signal level detecting unit 222, a corrected gain generating unit 223, and a multiplier unit 224. The generating circuits 211G and 211B for the other color signals have the same configuration. The correction signal generating unit 221 generates a streaking correction signal Sst for each line in response to the input image signal Rin. The correction signal generating unit 221 uses output signals of a horizontal shielded portion (horizontal optical black (HOPB)) and a vertical shielded portion (vertical optical black (VOPB)) of an image sensor to generate the streaking correction signal Sst" of each line.

Figure 11A:
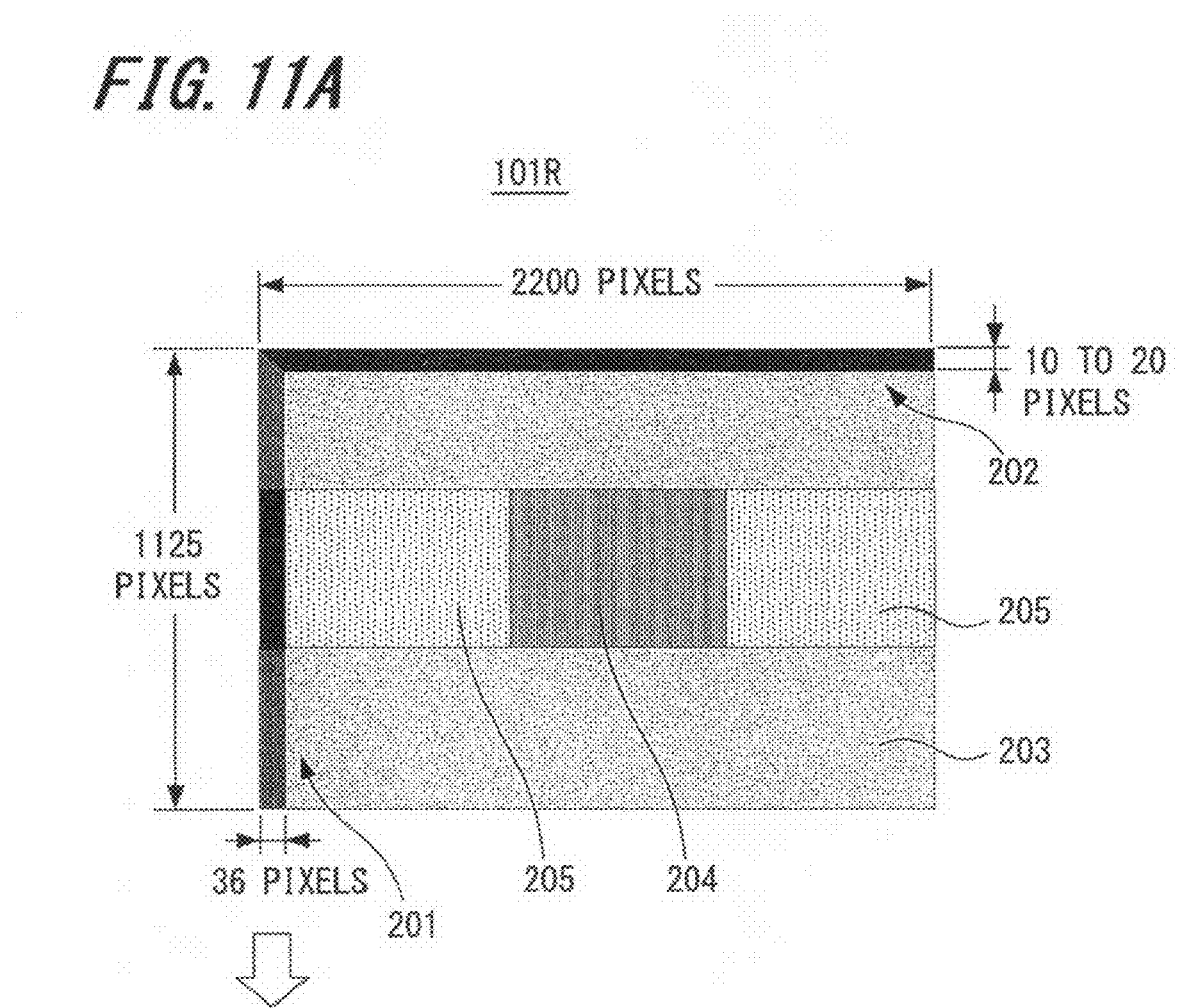
FIGS. 11A and 11B are diagrams showing an example of the configuration of an image sensor and streaking occurred.

The occurrence of streaking will now be described with reference to FIGS. 11A and 11B. FIG. 11A shows one example of the configuration of the image sensor 101R and a state where streaking occurs. As one example, the image sensor 101R is formed to include 2200 pixels in the horizontal direction and 1125 pixels (that is, 1125 lines) in the vertical direction. In addition, the image sensor 101R has a horizontal shielded portion (HOPB) 201 that is 36 pixels wide, for example, and a vertical shielded portion (VOPB) 202 that is 10 to 20 pixels high, for example. The other part of the image sensor 101R forms a light receiving portion 203 as an effective imaging region.

When an image of a high-luminance light source 204 is captured using the image sensor 101R, streaking 205 in the form of a stripe in the horizontal direction occurs.

Figure 12:
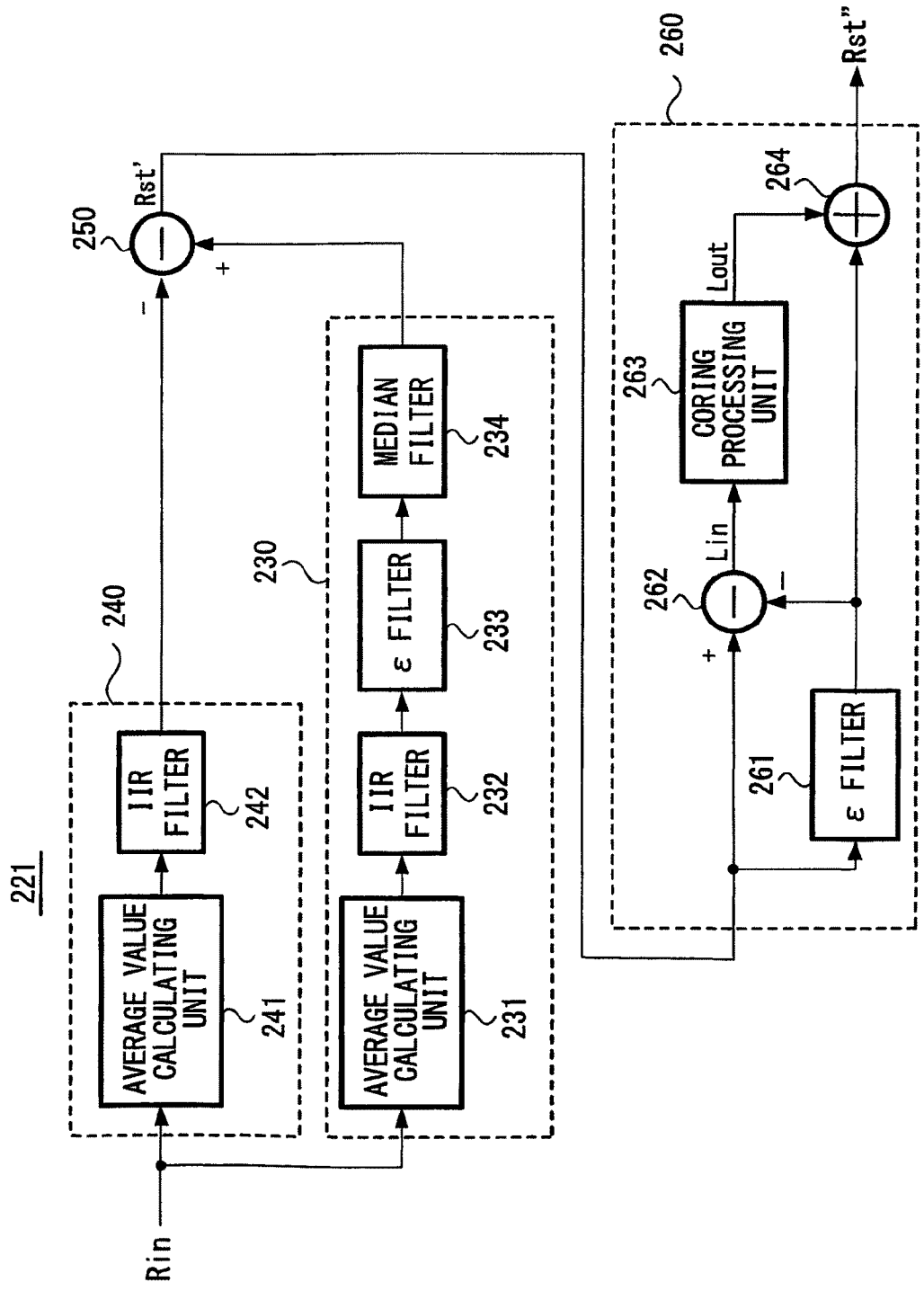
FIG. 12 is a block diagram showing a circuit configuration of a correction signal generating unit according to the second embodiment of the present invention.

FIG. 12 shows one example configuration of the correction signal generating unit 221. The correction signal generating unit 221 includes a shielded portion waveform detecting unit 230, a black level detecting unit 240, a subtracting unit 250, and a coring unit 260.

Figure 11B:
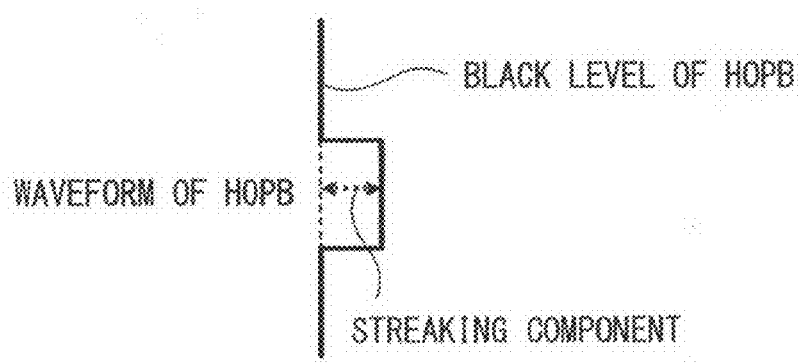

The shielded portion waveform detecting unit 230 uses the output signal of the horizontal shielded portion (HOPB) 201 of the image sensor to calculate the signal level of each line in the horizontal shielded portion (HOPB) 201 as shown in FIG. 11B. As shown in FIG. 12, in the shielded portion waveform detecting unit 230, an average value calculating unit 231, a digital filter (IIR filter) 232, an E (epsilon) filter 233, and a median filter 234 are connected in that order.

The average value calculating unit 231 calculates an average for the values of the pixels that form the horizontal shielded portion (HOPB) 201 on a line by line basis. This average value calculating unit 231 reduces noise that is spatially random in the horizontal direction. The IIR filter 232 averages the average pixel values of each line calculated by the average value calculating unit 231 on the time axis. The IIR filter 232 filters the input signal of the present frame and the output signal of the preceding frames using a feedback loop. Using the IIR filter 232, noise that is random on the time axis is reduced. Note that an FIR filter may be used in place of the IIR filter.

The ε filter 233 is a nonlinear filter for reducing small-amplitude noise. The ε filter 233 is used in the vertical direction on the average pixel values of the respective lines output from the IIR filter 232. Using the ε filter 233, random noise in the vertical direction is reduced.

The median (i.e., middle value) filter 234 is used in the vertical direction on the average pixel value of each line output from the ε filter 233. The median filter 234 arranges an odd number of values in order of magnitude, with the signal processed being centered, and obtains the middle value. Using the median filter 234, impulse-type noise is removed. A signal level of each line in the horizontal shielded portion 201 (i.e., the waveform of the horizontal shielded portion 201) described above is obtained from the median filter 234.

The black level detecting unit 240 detects the black level using the output signal of the vertical shielded portion 202 of the image sensor. As shown in FIGS. 11A and 11B, since streaking occurs in the signal of the horizontal shielded portion 201 during imaging, it may not be possible to precisely detect the black level from the output signal of the horizontal shielded portion 201. Accordingly, the black level detecting unit 240 detects the black level using the output signal of the vertical shielded portion 202.

The black level detecting unit 240 includes an average value calculating unit 241 and an IIR filter 242 as a digital filter connected in that order. In the black level detecting unit 240, since the IIR filter 242 is used on the time axis, it is possible to minimize the effect of noise while maintaining real-time operation.

The average value calculating unit 241 calculates an average of the values of the pixels that form the vertical shielded portion 202. The average value calculating unit 241 reduces noise that is spatially random in the horizontal direction and the vertical direction. The IIR filter 242 averages the average pixel values calculated in the average value calculating unit 241 on the time axis. The IIR filter 242 filters the input signal of the present frame and the output signal of the preceding frames using a feedback loop. Using the IIR filter 242, noise that is random on the time axis is reduced.

The subtracting unit 250 subtracts the black level detected by the black level detecting unit 240 from the signal level of each line in the horizontal shielded portion 201 detected by the shielded portion waveform detecting unit 230 to calculate a streaking correction signal Rst' of each line, or in other words, the streaking component of each line.

The coring unit 260 carries out coring processing on the streaking correction signal Rst' of each line obtained at the subtracting unit 250 and outputs the final streaking correction signal Rst" of each horizontal line. The coring unit 260 includes a ε filter 261, a subtractor 262, a coring processing unit 263, and an adder 264.

The ε filter 261 is a nonlinear filter for removing small-amplitude noise. The ε filter 261 is configured in the same way as the ε filter 233 in the shielded portion waveform detecting unit 230 described above. The ε filter 261 is used in the vertical direction on the streaking correction signal Rst' of each horizontal line output from the subtracting unit 250.

The subtractor 262 subtracts the signal corresponding to each line that has been generated by the ε filter 261 from the streaking correction signal of the line obtained by the subtracting unit 250 to extract a high frequency component Lin. The coring processing unit 263 carries out coring on the high frequency component Lin of each line obtained by the subtractor 262. That is, the coring processing unit 263 compares the magnitudes of the absolute value of the input signal Lin and the coring level set in advance, and when the absolute value of the input signal is larger than the coring level, the input signal Lin is set without amendment as the output signal Lout. On the other hand, when the coring level is larger than the absolute value of the input signal Lin, the output signal Lout is set at zero. That is, the coring processing by the coring processing unit 263 leaves comparatively large signal components, such as edges, and removes other components with low signal levels.

In FIG. 10, the correction signals Rst, Gst, Bst generated in this way by the respective correction signal generating circuits 211R, 211G, 211B are supplied to a subtractor 212 and are subtracted from the input signals Rin, Gin, Bin of the respective colors.

In the present embodiment, the signals of the respective colors from which the correction signals have been subtracted are supplied to the adders 271, 272, and 273 that each add a random number generated by a random number generator 274. When a random number is added, as one example a random number is added to least significant bits at a level not determined by quantization of the image signals generated by the streaking correction processing. After such addition, the least significant bits at the level not determined by quantization are removed to obtain the output signals Rout, Gout, and Bout. As the random number generator 274, a device that generates a different random number for the signal of each color is used, for example.

Figure 13:
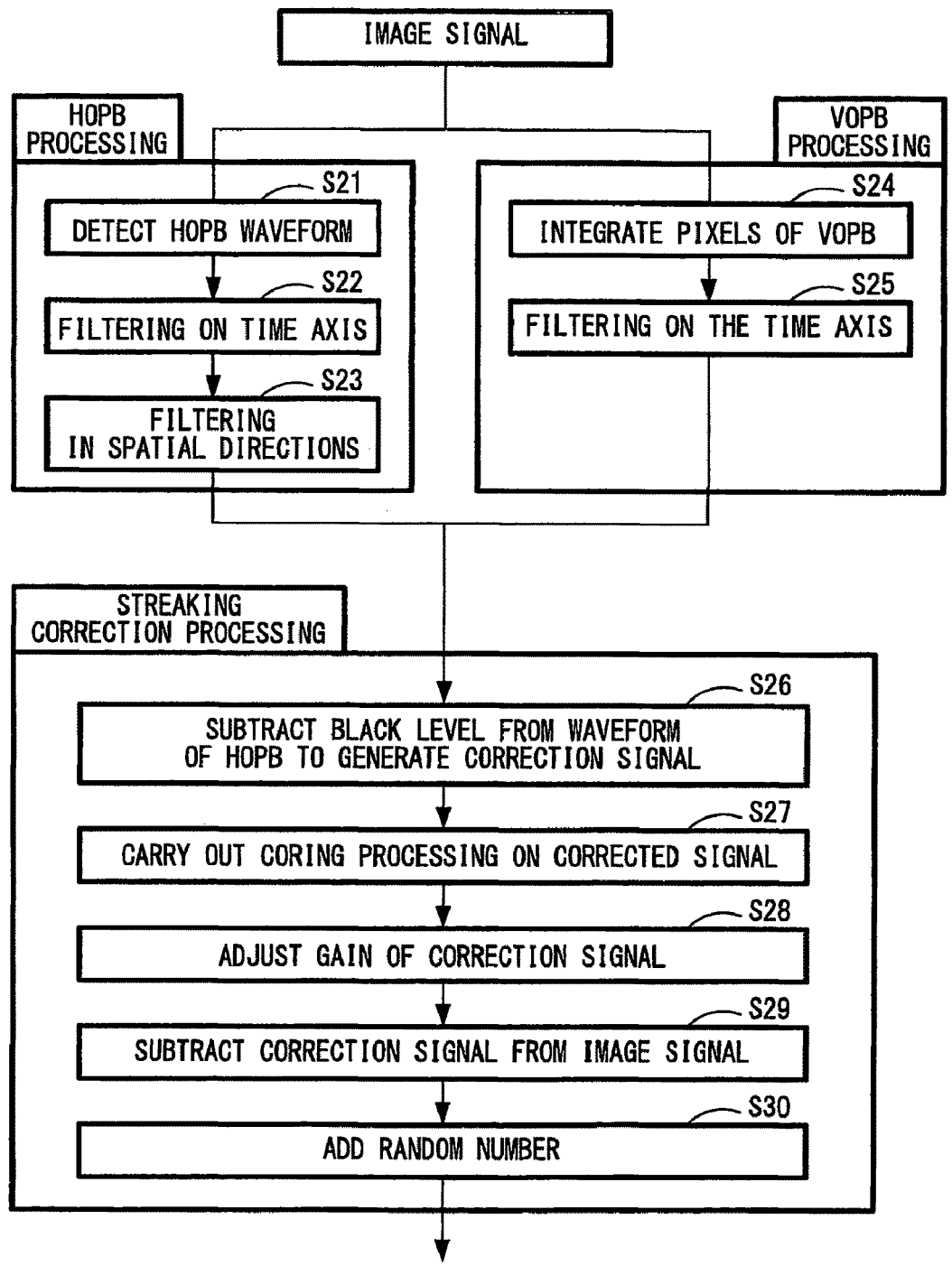
FIG. 13 is a flowchart showing an example of streaking correction processing according to the second embodiment of the present invention.

FIG. 13 is a flowchart showing the streaking correction processing. First, the waveform of the horizontal shielded portion is detected (step S21), filtering is carried out on the time axis (step S22), and then filtering is carried out in the spatial axes (step S23). The pixels of the vertical shielded portion are integrated (step S24), and filtering is carried out on the time axis (step S25).

Subsequently, the black level is subtracted from the waveform of horizontal shielded portion to generate the correction signal (step S26), the coring processing is carried out on the correction signal (step S27), the gain of the correction signal is adjusted (step S28), and then the resulting correction signal is subtracted from the image signal (step S29). In addition, a random number is added to the image signal from which the correction signal has been subtracted (step S30).

Note that with streaking, there are cases where the level detected at a horizontal shielded portion and the level detected at effective pixel region may not necessarily match due to changes in the image signal level and/or temperature. One example of such case is shown in FIG. 14. FIG. 14 shows the relationship between the signal level and a streaking ratio (i.e. streaking amount of an effective pixel region/streaking amount of the HOPB). To cope with such characteristics, in a correction amount subtraction circuit, the signal level of a target pixel to be corrected is detected and the correction gain is decided referring to a look up table (LUT) prepared in advance corresponding to the image sensor.

Subsequently, in the same way as the vertical line correction described in the first embodiment, since the streaking correction signal is generated from an average value of at least four pixels in the image signal, when two effective bits are present below the least significant bit of the image signal and the image signal is eight-bit, the result of subtracting the streaking component may have ten effective bits. When this is restored to eight bits, processing that adds a two-bit random number and discards the least significant two bits of the result to fetch the most significant eight bits is carried out using the configuration shown in FIG. 10. As the detailed processing that adds a quantization error value, it is possible to use the same processing as that in the first embodiment shown in FIG. 8A. In this second embodiment also, a different number of bits may be used as the number of bits in each signal.

By adding such random number, it is possible during streaking correction to reduce the quantization error and greatly improve image quality, such as when digital amplification is carried out in low light conditions.

It should be understood by those skilled in the art that various modifications, combinations, sub-combinations and alterations may occur depending on design requirements and other factors insofar as they are within the scope of the appended claims or the equivalents thereof.

What is claimed is:

1. A noise correction circuit that detects and corrects noise included in an image signal output from an image sensor, the noise correction circuit comprising:
   a noise detecting unit that calculates an average value of a signal level in a predetermined range of the image signal output from the image sensor and uses the calculated average value to calculate a noise component in a predetermined direction;
   a subtractor that removes noise from the image signal output from the image sensor in response to the noise component determined by the noise detecting unit; and
   an adder that adds a random number at a level not determined by quantization of the image signal to the image signal after removal of the noise by the subtractor;
   a further subtractor that subtracts the average value from the image signal; and
   an integrator that integrates the image signal, from which the average value has been subtracted, in a predetermined direction to calculate a fixed pattern noise component in the form of stripes in a vertical direction,
   wherein the adder adds the random number to least significant bits generated at a level not determined by quantization of the image signal and subsequently discards the least significant bits.

2. A noise correction circuit according to claim 1, wherein the adder is provided for each color component of the image signal output from the image sensor and different random numbers are added to each color component.

3. A noise correction circuit that detects and corrects noise included in an image signal output from an image sensor, the noise correction circuit comprising:
   a correction signal generating unit that includes:
      a shielded portion waveform detecting unit configured to use output signals of a horizontal shielded portion of the image sensor to calculate a signal level of each line in the horizontal shielded portion,
      a black level detecting unit configured to detect a black level using output signals of a vertical shielded portion of the image sensor, and
      a first subtracting unit configured to subtract the black level detected by the black level detecting unit from a signal level of each line in the horizontal shielded portion calculated by the shielded portion waveform detecting unit to calculate a streaking correction signal for each line;
   a corrected gain generating unit configured to generate a corrected gain for a signal level of an image signal output from the image sensor and multiply the streaking correction signal generated by the noise determining unit by the generated corrected gain;
   a second subtracting unit configured to subtract the streaking correction signal multiplied by the corrected gain at the corrected gain generating unit from the image signal output from the image sensor; and
   an adder that adds a random number at a level not determined by quantization of the image signal to the image signal after subtraction of the streaking correction signal multiplied by the corrected gain from the image signal by the second subtracting unit.

4. An imaging apparatus, comprising:
   an image sensor; and
   a noise correction circuit that detects and corrects noise included in an image signal output from the image sensor, the noise correction circuit including:
      a noise detecting unit that calculates an average value of a signal level in a predetermined range of an image signal output from the image sensor and uses the calculated average value to calculate a noise component in a predetermined direction of the image signal output from the image sensor,
      a subtractor that removes noise from the image signal output from the image sensor unit in response to the noise component determined by the noise detecting unit, an adder that adds a random number at a level not determined by quantization of the image signal to the image signal after removal of the noise by the subtractor, a further subtractor that subtracts the average value from the image signal, and an integrator that integrates the image signal, from which the average value has been subtracted, in a predetermined direction to calculate a fixed pattern noise component in the form of stripes in a vertical direction, wherein the adder adds the random number to least significant bits generated at a level not determined by quantization of the image signal and subsequently discards the least significant bits.

5. An imaging apparatus that detects and corrects noise included in an image signal output from an image sensor, the imaging apparatus comprising:

a correction signal generating unit that includes:
a shielded portion waveform detecting unit configured to use output signals of a horizontal shielded portion of the image sensor to calculate a signal level of each line in the horizontal shielded portion, a black level detecting unit configured to detect a black level using output signals of a vertical shielded portion of the image sensor, and a first subtracting unit configured to subtract the black level detected by the black level detecting unit from a signal level of each line in the horizontal shielded portion calculated by the shielded portion waveform detecting unit to calculate a streaking correction signal for each line;

a corrected gain generating unit configured to generate a corrected gain for a signal level of an image signal output from the image sensor and multiply the streaking correction signal generated by the noise determining unit by the generated corrected gain; and a second subtracting unit configured to subtract the streaking correction signal multiplied by the corrected gain at the corrected gain generating from the image signal output from the image sensor; and an adder that adds a random number at a level not determined by quantization of the image signal to the image signal after subtraction of the streaking correction signal multiplied by the corrected gain from the image signal by the second subtracting unit.

6. A noise correction method that detects and corrects noise included in an image signal output from an image sensor, the method comprising:

calculating an average value of a signal level in a predetermined range of the image signal output from the image sensor and using the calculated average value to calculate a noise component in a predetermined direction of the image signal output from the image sensor;

removing noise from the image signal output from the image sensor in response to the calculated noise component; and adding a random number at a level not determined by quantization of the image signal to the image signal after removal of the noise, wherein the calculating step includes:
subtracting the average value from the image signal, and
integrating the image signal, from which the average value has been subtracted, in a predetermined direction to calculate a fixed pattern noise component in the form of stripes in a vertical direction, and wherein the random number adding step adds the random number to least significant bits generated at a level not determined by quantization of the image signal and subsequently discards the least significant bits.

7. A noise correction method according to claim 6, wherein the random number adding step is carried out for each color component of the image signal output from the image sensor and different random numbers are added to each color component.

* * * * *